(12) United States Patent
Kim et al.

(10) Patent No.: US 10,437,793 B2
(45) Date of Patent: Oct. 8, 2019

(54) BI CLOUD SERVICES DATA MODELING DENORMALIZED TABLE INTROSPECTION ALGORITHM

(71) Applicant: Oracle International Corporation, Redwood Shores, CA (US)

(72) Inventors: Paul Kim, Round Rock, TX (US); Boris Nikulitsa, Saint-Petersburg (RU); Samar Lotia, Cupertino, CA (US); Raghuram Venkatasubramanian, Cupertino, CA (US); Vijay Jain, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 710 days.

(21) Appl. No.: 14/785,677

(22) PCT Filed: Jul. 24, 2015

(86) PCT No.: PCT/RU2015/000476
§ 371 (c)(1),
(2) Date: Oct. 20, 2015

(87) PCT Pub. No.: WO2017/018904
PCT Pub. Date: Feb. 2, 2017

(65) Prior Publication Data
US 2017/0024421 A1    Jan. 26, 2017

(51) Int. Cl.
*G06F 17/30* (2006.01)
*G06F 16/21* (2019.01)
*G06F 16/245* (2019.01)
*G06F 16/22* (2019.01)
*G06F 16/25* (2019.01)

(52) U.S. Cl.
CPC .......... *G06F 16/212* (2019.01); *G06F 16/214* (2019.01); *G06F 16/2228* (2019.01); *G06F 16/2282* (2019.01); *G06F 16/245* (2019.01); *G06F 16/254* (2019.01); *G06F 16/258* (2019.01)

(58) Field of Classification Search
CPC .... G06F 16/212; G06F 16/258; G06F 16/254; G06F 16/214; G06F 16/245; G06F 16/2282; G06F 16/2228
See application file for complete search history.

(56) References Cited

U.S. PATENT DOCUMENTS 6,768,986 B2   7/2004   Cras
6,915,306 B1   7/2005   Gong
(Continued)

OTHER PUBLICATIONS

EF Database First with ASP.NET MVC Creating; obtained at http://www.asp.net/mvc/overview/getting-started/database-first-development/creating-the-web-application; Oct. 1, 2014; 9 pages.
(Continued)

*Primary Examiner* — Alicia M Willoughby
(74) *Attorney, Agent, or Firm* — Trellis IP Law Group, PC

(57) ABSTRACT

A computer implemented algorithm performs introspection of an uploaded denormalized table and identifies candidate fact and dimension tables. The cardinality values of columns in a candidate dimension table are analyzed to identify simple/complex primary key candidates. Unused columns are further analyzed for assignment to candidate fact and/or dimension tables.

27 Claims, 19 Drawing Sheets

(56) References Cited

U.S. PATENT DOCUMENTS

| | | | |
|---|---|---|---|
| 8,131,533 B2 | 3/2012 | Legault | |
| 2005/0149505 A1* | 7/2005 | Bossman | G06F 17/30306 |
| 2006/0259507 A1* | 11/2006 | Higuchi | G06F 17/30592 |
| 2007/0233634 A1* | 10/2007 | Corvinelli | G06F 17/30469 |
| 2008/0059412 A1* | 3/2008 | Tarin | G06F 17/30592 |
| 2008/0140696 A1* | 6/2008 | Mathuria | G06F 17/30315 |
| 2009/0265335 A1* | 10/2009 | Hoffman | G06F 17/30592 |
| 2014/0006866 A1* | 1/2014 | Clifford | G06F 11/3684 714/32 |
| 2014/0181154 A1* | 6/2014 | Amulu | G06F 17/30587 707/803 |
| 2016/0019251 A1* | 1/2016 | Marks | G06F 17/30303 707/752 |

OTHER PUBLICATIONS

MicroStrategy; obtained at http://microstrategytechbuzz.blogspot.in/2013/04/designing-data-warehouse-schema.html; downloaded Feb. 20, 2015; 3 pages.

Qlik View Data Model; http://www.rsrit.com/blog/2014/02/25/basic-knowledge-qlikview-data-model/; downloaded Feb. 25, 2014; 2 pages.

Dimensional Modeling with IBM InfoSphere Data Architect, Part 2: Reverse Engineering; obtained at http://www.ibm.com/developerworks/data/library/techarticle/dm-1112dimmodelingpart2/; Dec. 8, 2011, 28 pages.

\* cited by examiner

Denorm Table Analysis #1
Table

Overview | Data

Denorm Table Analysis #1
All 5 rows displayed

| CUST_KEY | CUST_NAME | CUST_GENDER |
|---|---|---|
| 1 | Name #1 | M |
| 2 | Name #2 | M |
| 3 | Name #3 | M |
| 4 | Name #1 | F |
| 5 | Name #3 | F |

Fig. 3

Add Denorm Table Analysis #1 to New Data Model    Next

Modeler has detected 1 Dimension table, 2 attributes, 1 join. Review and modify recommendations as needed before adding to model.

| Source Table | Fact Table | Dimension Tables | Add |

Denorm Table

NEW_FACT

CUST

| | Source Table | | Fact Table | | Dimension Tables |
|---|---|---|---|---|---|
| | | | COLUMN + | | COLUMN + |
| ✓ | CUST_GENDER | ☑ | CUST_KEY | ☐ | CUST_GENDER |
| ✓ | CUST_KEY | | | ☑ | CUST_KEY |
| ✓ | CUST_NAME | | | ☐ | CUST_NAME |

Fig. 4

| Denorm Table Analysis #3 |||| 
| :--- | :--- | :--- | :--- |
| Table ||||
| Overview / Data ||||
| Denorm Table Analysis #3 ||||
| All 5 rows displayed ||||
| CUST_KEY | CUST_NAME | CUST_GENDER | CUST_MARITAL STATUS |
| 1 | Name #1 | M | Married |
| 2 | Name #2 | M | Married |
| 3 | Name #3 | M | |
| 4 | Name #1 | F | Married |
| 4 | Name #3 | F | Married |

Fig. 5

Add Denorm Table Analysis #3 to New Data Model

[Next]

Modeler has detected 1 Dimension table, 2 attributes, 2 joins. Review and modify recommendations as needed before adding to model.

| Source Table | Fact Table | Dimension Tables | [Add] |
| :--- | :--- | :--- | :--- |
| Denorm Table | NEW_FACT | CUST | |

| Source Table | | Fact Table | | Dimension Tables | |
| :--- | :--- | :--- | :--- | :--- | :--- |
| ✓ | CUST_GENDER | COLUMN ➕ || COLUMN ➕ ||
| ✓ | CUST_KEY | ☑ | CUST_KEY | ☐ | CUST_GENDER |
| ✓ | CUST_MARITAL_STATUS | ☑ | CUST_NAME | ☑ | CUST_KEY |
| ✓ | CUST_NAME | | | ☐ | CUST_MARITAL_STATUS |
| | | | | ☑ | CUST_NAME |

Fig. 6

Denorm Table Analysis #10
Table

Overview | Data

Denorm Table Analysis #10
All 7 rows displayed

| AIRPORT_ID | AIRPORT | AIRPORT_NAME | CITY |
|---|---|---|---|
| 1 | ORD | ORD - O'Hare | Chicago, IL |
| 2 | JFK | JFK – John F. Kennedy International | New York, NY |
| 3 | LGA | LGA - LaGuardia | New York, NY |
| 4 | EFD | EFD – Ellington Field | Houston, TX |
| 5 | HOU | HOU – William P Hobby | Houston, TX |
| 6 | IAH | IAH – George Bush Intercontinental/Houston | Houston, TX |
| 7 | MDW | MDW – Chicago Midway international | Chicago, IL |

Fig. 9

Add Denorm Table Analysis #10 to New Data Model

[Next]

Modeler has detected 1 Dimension table, 3 attributes, 1 join. Review and modify recommendations as needed before adding to model.

| Source Table | Fact Table | Dimension Tables [Add] |
|---|---|---|
| Denorm Table | NEW_FACT | AIRPORT |

| | Fact COLUMN + | | Dimension COLUMN + |
|---|---|---|---|
| ✓ AIRPORT | ☑ AIRPORT_ID | ☐ | AIRPORT |
| ✓ AIRPORT_ID | | ☑ | AIRPORT_ID |
| ✓ AIRPORT_NAME | | ☐ | AIRPORT_NAME |
| ✓ CITY | | ☐ | CITY |

Fig. 10

Denorm Table Analysis #11
Table

Overview | Data

Denorm Table Analysis #11
All 7 rows displayed

| AIRPORT | AIRPORT_NAME | CITY |
|---|---|---|
| ORD | O'Hare | Chicago, IL |
| JFK | John F. Kennedy International | New York, NY |
| LGA | LaGuardia | New York, NY |
| EFD | Ellington Field | Houston, TX |
| HOU | William P Hobby | Houston, TX |
| IAH | George Bush Intercontinental/Houston | Houston, TX |
| MDW | Chicago Midway international | Chicago, IL |

Fig. 11

Add Denom Table Analysis #11 to New Data Model

[Next]

Modeler has detected 1 Dimension table, 2 attributes, 1 join. Review and modify recommendations as needed before adding to model.

| Source Table | Fact Table | Dimension Tables [Add] |
|---|---|---|
| Denorm Table | NEW_FACT | AIRPORT |
| ✓ AIRPORT<br>✓ AIRPORT_NAME<br>✓ CITY | COLUMN +<br>☑ AIRPORT | COLUMN +<br>☑ AIRPORT<br>☐ AIRPORT_NAME<br>☐ CITY |

Fig. 12

Denorm Table Analysis #7
Table

Overview | Data

Denorm Table Analysis #7
All 5 rows displayed

| CUST_KEY | CUST_NAME | CUST_BILL | CUST_CATEGORY |
|---|---|---|---|
| 1 | Name #1 Surname#1 | 0 | 0 |
| 2 | Name #2 Surname#1 | 3000.25 | 2 |
| 3 | Name #3 Surname#2 | -100.05 | -1 |
| 4 | Name #3 Surname#2 | 324.1 | 1 |
| 5 | Name #4 Surname#4 | 0 | 0 |

Fig. 13

Add Denom Table Analysis #7 to New Data Model

[Next]

Modeler has detected 1 Fact table, 1 Dimension table, 1 measure, 2 attributes, 1 join. Review and modify recommendations as needed before adding to model.

Source Table     Fact Table     Dimension Tables [Add]

Denorm Table

| NEW_FACT |
|---|
| COLUMN + |
| CUST_BILL |
| ☑ CUST_KEY |

| CUST |
|---|
| COLUMN + |
| ☐ CUST_CATEGORY |
| ☑ CUST_KEY |
| ☐ CUST_NAME |

✓ CUST_BILL
✓ CUST-CATEGORY
✓ CUST_KEY
✓ CUST_NAME

Fig. 14

Denorm Table Analysis #8
Table

Overview | Data

Denorm Table Analysis #8
All 5 rows displayed

| CUST_KEY | CUST_NAME | CUST_BILL | CATEGORY |
|---|---|---|---|
| 1 | Name #1 Surname#1 | 0 | 0 |
| 2 | Name #2 Surname#1 | 3000.25 | 2 |
| 3 | Name #3 Surname#2 | -100.05 | -1 |
| 4 | Name #3 Surname#2 | 324.1 | 1 |
| 5 | Name #4 Surname#4 | 0 | 0 |

Fig. 15

Add Denom Table Analysis #8 to New Data Model

[Next]

Modeler has detected 1 Fact table, 1 Dimension table, 2 measures, 2 attributes, 1 join. Review and modify recommendations as needed before adding to model.

| Source Table | Fact Table | Dimension Tables | [Add] |
|---|---|---|---|
| Denorm Table | NEW_FACT | CUST | |
| ✓ CATEGORY | COLUMN + | COLUMN + | |
| ✓ CUST_BILL | CATEGORY | ☐ CATEGORY | |
| ✓ CUST_KEY | CUST_BILL | ☑ CUST_KEY | |
| ✓ CUST_NAME | ☑ CUST_KEY | ☐ CUST_NAME | |

Fig. 16

Denorm Table Analysis #9
Table

Overview | Data

Denorm Table Analysis #9

All 5 rows displayed

| CUST_KEY | CUST_NAME | CUST_BILL | CATEGORY_ID | CATEGORY_NAME | STATUS |
|---|---|---|---|---|---|
| 1 | Name #1 Surname#1 | 0 | 1 | New Customers | 0 |
| 2 | Name #2 Surname#1 | 3000.25 | 4 | Favorite Customers | 2 |
| 3 | Name #3 Surname#2 | -100.05 | 3 | Debtor Customers | -1 |
| 4 | Name #3 Surname#2 | 324.1 | 2 | Active Customers | 1 |
| 5 | Name #4 Surname#4 | 0 | 1 | New Customers | 0 |

Fig. 17

Add Denorm Table Analysis #9 to New Data Model

[Next]

Modeler has detected 1 Fact table, 2 Dimension tables, 2 measures, 3 attributes, 2 joins. Review and modify recommendations as needed before adding to model.

Source Table | Fact Table | Dimension Tables | [Add]

Denorm Table

| | | NEW_FACT | | CATEGORY |
|---|---|---|---|---|

✓ CATEGORY_ID
✓ CATEGORY_NAME
✓ CUST_BILL
✓ CUST_KEY
✓ CUST_NAME
✓ STATUS

| COLUMN + | | COLUMN + |
|---|---|---|
| CUST_BILL | ☑ | CATEGORY_ID |
| STATUS | ☐ | CATEGORY_NAME |
| ☑ CATEGORY_ID | ☐ | STATUS |
| ☑ CUST_KEY | | |

CUST

| COLUMN + |
|---|
| ☑ CUST_KEY |
| ☐ CUST_NAME |

PREVIEW
Select a column to preview its values.

Fig. 18

| CUST_KEY | CUST_NAME | CUST_GENDER |
|---|---|---|
| 390 | Dave Jones | M |
| 1628 | Dave Jones | M |
| 2517 | Sam Sam | M |
| 3045 | Dave Jones | M |
| 6569 | Patrick Wren | M |
| 6913 | Robert Paul | M |
| 9919 | Robert Paul | M |

FIG. 20

| KEY | NAME | TYPE | GENDER | KEY | NAME | TYPE | GENDER |
|---|---|---|---|---|---|---|---|
| 1 | A | A | M | 1 | A | B | M |
| 2 | B | A | F | 2 | B | B | F |
| 3 | C | A | M | 3 | C | B | M |
| 4 | D | A | F | 4 | D | B | F |
| 5 | A | C | M | 5 | C | C | M |
| 6 | B | C | F | 6 | D | C | F |

FIG. 21

| Add BICS_REVENUE_FT2 To New Data Model | 2202 | |
|---|---|---|
| | | Next |

Modeler has detected 1 Fact table, 6 Dimension tables, 5 measures, 24 attributes, 6 joins. Review and modify 2204
recommendations as needed before adding to model.

Source Table 2206  Fact Table 2208  Dimension Tables 2210  [Add]

BICS_REVENUE_FT2

- ✓ ADDRESS1
- ✓ ADDRESS2
- ✓ ADDR_KEY
- ✓ AREA
- ✓ CHANNEL_NAME
- ✓ CITY
- ✓ COST_FIXED
- ✓ COST_VARIABLE
- ✓ COUNTRY_CODE
- ✓ COUNTRY_NAME
- ✓ CUST_BIRTH_DT
- ✓ CUST_CRDT_RATE
- ✓ CUST_GENDER

NEW_FACT

| COLUMN | + |
|---|---|
| | COST_FIXED |
| | COST_VARIABLE |
| | DISCNT_VALUE |
| | REVENUE |
| | UNITS |
| ☑ | ADDR_KEY |
| ☑ | COUNTRY_CODE |
| ☑ | CUST_NUMBER |
| ☑ | PROD_ITEM_KEY |
| ☑ | ORDER_KEY |
| ☑ | PRODUCT |

ADDR

| COLUMN | + |
|---|---|
| ☐ | ADDRESS1 |
| ☐ | ADDRESS2 |
| ☑ | ADDR_KEY |
| ☐ | CITY |
| ☐ | POSTAL_CODE |
| | STATE_PROV |

COUNTRY

| COLUMN | + |
|---|---|
| ☐ | AREA |
| ☑ | COUNTRY_CODE |
| ☐ | COUNTRY_NAME |
| ☐ | REGION |

PREVIEW
*Select a column to preview its values.*

Add BICS_REVENUE_FT2 To New Data Model

[Next]

Modeler has detected 1 Fact table, 6 Dimension tables, 5 measures, 24 attributes, 6 joins. Review and modify recommendations as needed before adding to model.

| Source Table | Fact Table | Dimension Tables | [Add] |
|---|---|---|---|

Source Table: BICS_REVENUE_FT2
- ✓ ADDRESS1
- ✓ ADDRESS2
- ✓ ADDR_KEY
- ✓ AREA
- ✓ CHANNEL_NAME
- ✓ CITY
- ✓ COST_FIXED
- ✓ COST_VARIABLE
- ✓ COUNTRY_CODE
- ✓ COUNTRY_NAME
- ✓ CUST_BIRTH_DT
- ✓ CUST_CRDT_RATE
- ✓ CUST_GENDER

Fact Table: NEW_FACT

| COLUMN | + |
|---|---|
| COST_FIXED | |
| COST_VARIABLE | |
| DISCNT_VALUE | |
| REVENUE | |
| UNITS | |
| ☑ ADDR_KEY | |
| ☑ COUNTRY_CODE | |
| ☑ CUST_NUMBER | |
| ☑ PROD_ITEM_KEY | |
| ☑ ORDER_KEY | |
| ☑ PRODUCT | |

Dimension Tables

CUST_NAME
☑ CUST_NUMBER

ITEM

| COLUMN | + |
|---|---|
| ☐ PROD_ITEM_DSC | |
| ☑ PROD_ITEM_KEY | |
| ☐ PROD_LOB | |
| ☐ PROD_TYPE | |

ORDER

| COLUMN | + |
|---|---|
| ☐ CHANNEL_NAME | |
| ☑ ORDER_KEY | |
| ☐ ORDER_STATUS | |
| ☐ TIME_BILL_DT | |

PREVIEW

*Select a column to preview its values.*

Add BICS_REVENUE_FT2 To New Data Model

[Next]

Modeler has detected 1 Fact table, 6 Dimension tables, 5 measures, 24 attributes, 6 joins. Review and modify recommendations as needed before adding to model.

| Source Table | Fact Table | Dimension Tables | [Add] |
|---|---|---|---|

BICS_REVENUE_FT2
- ✓ ADDRESS1
- ✓ ADDRESS2
- ✓ ADDR_KEY
- ✓ AREA
- ✓ CHANNEL_NAME
- ✓ CITY
- ✓ COST_FIXED
- ✓ COST_VARIABLE
- ✓ COUNTRY_CODE
- ✓ COUNTRY_NAME
- ✓ CUST_BIRTH_DT
- ✓ CUST_CRDT_RATE
- ✓ CUST_GENDER

NEW_FACT
- COLUMN +
- COST_FIXED
- COST_VARIABLE
- DISCNT_VALUE
- REVENUE
- UNITS
- ☑ ADDR_KEY
- ☑ COUNTRY_CODE
- ☑ CUST_NUMBER
- ☑ PROD_ITEM_KEY
- ☑ ORDER_KEY
- ☑ PRODUCT

Dimension Tables:
- PROC_ITEM_DSC
- PROD_ITEM_KEY
- PROD_LOB
- PROD_TYPE
- PROD

ORDER
- COLUMN +
- ☐ CHANNEL_NAME
- ☑ ORDER_KEY
- ☐ ORDER_STATUS
- ☐ TIME_BILL_DT
- ☐ TIME_PAID_DT

PROD
- COLUMN +

PREVIEW
Select a column to preview its values.

BI CLOUD SERVICES DATA MODELING DENORMALIZED TABLE INTROSPECTION ALGORITHM

BACKGROUND

Cloud computing is a significant advancement in the delivery of information technology and services. By providing on-demand access to a shared pool of computing resources in a self service, dynamically scaled and metered manner, cloud computing offers compelling advantages in cost, speed and efficiency.

Data modeling has typically been left to database administrators with a high level of understanding of database design and definitions. However, users without access to skilled database administrators have had to manually generate data models based on their own limited knowledge and expertise.

With the addition of BI (Business Intelligence) cloud products, a larger audience of users, who may not have the technical knowledge previously required to create data models, will have the ability to create data models and reports.

SUMMARY

A further understanding of the nature and the advantages of particular embodiments disclosed herein may be realized by reference to the remaining portions of the specification and the attached drawings.

In an example embodiment, the denormalized table introspection algorithm provides the ability to pre-populate models based on the data sets and database definitions that already exist in the database. This is done by analyzing the table definitions, including keys, table names and column names, as well as the data content.

In another example embodiment, a method performed by one or more processors of a web server, comprises the steps of identifying columns of a source table having entries of data type "real" as measure column candidates, with the source table stored in an external database coupled to the web server by a network, and with the source table including a plurality of rows and columns with each column having a multi-character name and having one or more entries, with entries in a single column constrained to being of a single data type and with each column having a cardinality value equal to the number of distinct entries in the column, combining non-measure column candidates identified as having names including a common character string into a dimension candidate group, running one or more structured query language (SQL) statements to determine a column cardinality value of each single column in the dimension candidate group and a group cardinality value of all the columns in the dimension candidate group, designating each single column having a column cardinality value equal to the group cardinality value as a simple key candidate column, executing one or more structured query language (SQL) statements to determine a column-pair cardinality value of each pair of columns in the dimension candidate group if no simple key candidate exists, designating a pair of columns in the dimension candidate group having a column-pair cardinality value equal to the group cardinality value as a complex key candidate pair of columns of the dimension candidate group and grouping measure column candidates and keys of dimension candidate groups to form a candidate fact table.

In another example embodiment, only a limited number of rows of a source table are analyzed to minimize bandwidth consumption in a cloud operating environment.

Other features and advantages of the invention will be apparent in view of the following detailed description and appended drawings.

BRIEF DESCRIPTION OF THE DRAWINGS

FIGS. 3-18 are GUI screen shots of an example table and analysis output illustrating the operation of an example embodiment;

FIGS. 20 and 21 are example tables for illustrating the operation of an example algorithm;

FIG. 22 is a GUI screen shot illustrating results obtained after applying an example algorithm to a denormalized table;

FIGS. 23 and 24 are GUI screens shots depicting a GUI for accepting input signals to move a column between dimension tables;

FIGS. 25 and 26 are GUI screens shots depicting a GUI for accepting input signals to merge first and second dimension tables;

DETAILED DESCRIPTION OF EMBODIMENTS

Figure 1:
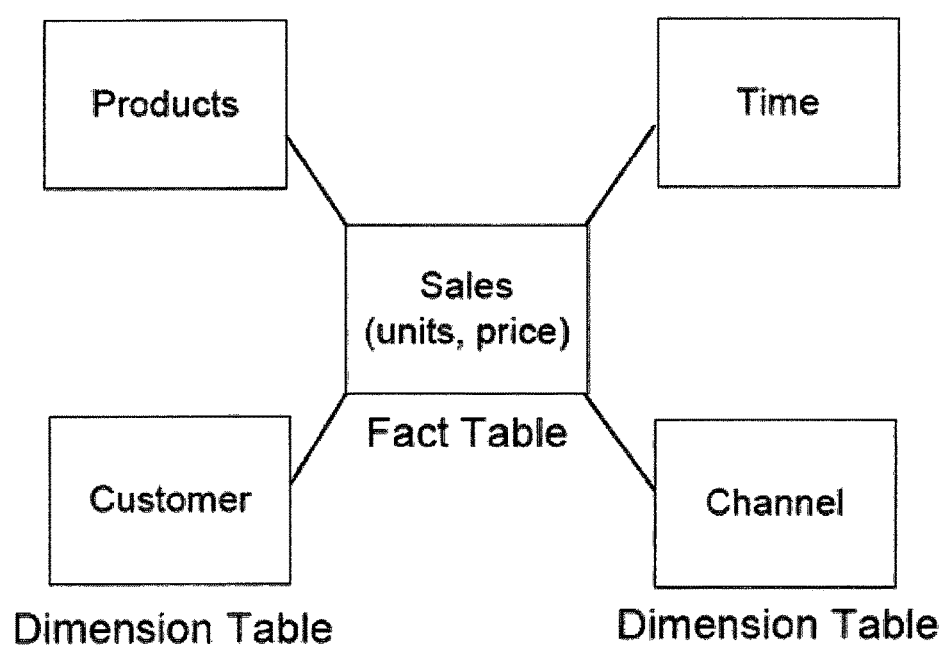
FIG. 1 is a block diagram illustrating an example of a star schema.

Although the invention has been described with respect to particular embodiments thereof, these particular embodiments are merely illustrative, and not restrictive.

One aspect of data modeling is normalization of tables in a database. Normalization is a series of steps followed to obtain a database design that allows for efficient access and storage of data. These steps reduce data redundancy and the chances of data becoming inconsistent.

A database includes a number of tables with each table having a name and one or more rows. Each row may include one or more attributes (also called fields) stored in one or more columns.

A functional dependency occurs when one attribute (e.g., A) uniquely determines another attribute (e.g., B). This relationship is written A→B which is the same as stating that B is functionally dependent on A.

The First Normal Form eliminates repeating groups by putting each group into a separate table and connecting them with a one-to-many relationship. Two rules follow this definition: (1) each table has a primary key made of one or several fields and uniquely identifying each record; and (2) each field is atomic, it does not contain more than one value.

The Second Normal Form eliminates functional dependencies on a partial key by putting the fields in a separate table from those that are dependent on the whole key.

The Third Normal Form eliminates functional dependencies on non-key fields by putting them in a separate table. At this stage, all non-key fields are dependent on the key, the whole key and nothing but the key.

The Fourth Normal Form separates independent multi-valued facts stored in one table into separate tables.

The Fifth Normal Form breaks out data redundancy that is not covered by any of the previous normal forms.

The star schema is the simplest data warehouse schema. A star schema model can be depicted as a simple star: a central table contains fact data and multiple tables radiate out from it, connected by the primary and foreign keys of the database.

A star schema is characterized by one or more very large fact tables that contain the primary information in the data warehouse and a number of much smaller dimension tables (or lookup tables), each of which contains information about the entries for a particular attribute in the fact table.

A typical fact table contains keys and measures. For example, a simple fact table might contain the measure Sales, and keys Time, Product, and Market. A measure is typically a numeric or character column, and can be taken from one column in one table or derived from two columns in one table or two columns in more than one table.

Dimensions define characteristics of the fact table such as a time dimension describing when facts are entered, a geographical dimension describing location data, a product dimension describing product data and characteristics, an employee dimension describing employee characteristics and data or a customer dimension describing customer characteristics or data. In this case, there would be corresponding dimension tables for Time, Product, and Market. The Product dimension table, for example, would typically contain information about each product number that appears in the fact table.

FIG. 1 depicts a graphical representation of a star schema. The fact table is named sales and includes units and prices fields. The dimensions tables are named products, time, customer and channel.

A star query is a join between a fact table and a number of lookup tables. Each lookup table is joined to the fact table using a primary-key to foreign-key join, but the lookup tables are not joined to each other.

In the example of FIG. 1 each dimension table has a primary key in the form (dimension name)_ID. The fact table contains only foreign keys and the fact table is not required to have a primary key.

A star join is a primary-key to foreign-key join of the dimension tables to a fact table. The fact table normally has a concatenated index on the key columns to facilitate this type of join.

The main advantages of star schemas are that they: (1) provide a direct and intuitive mapping between the business entities being analyzed by end users and the schema design; and (2) provide highly optimized performance for typical data warehouse queries.

Figure 2:
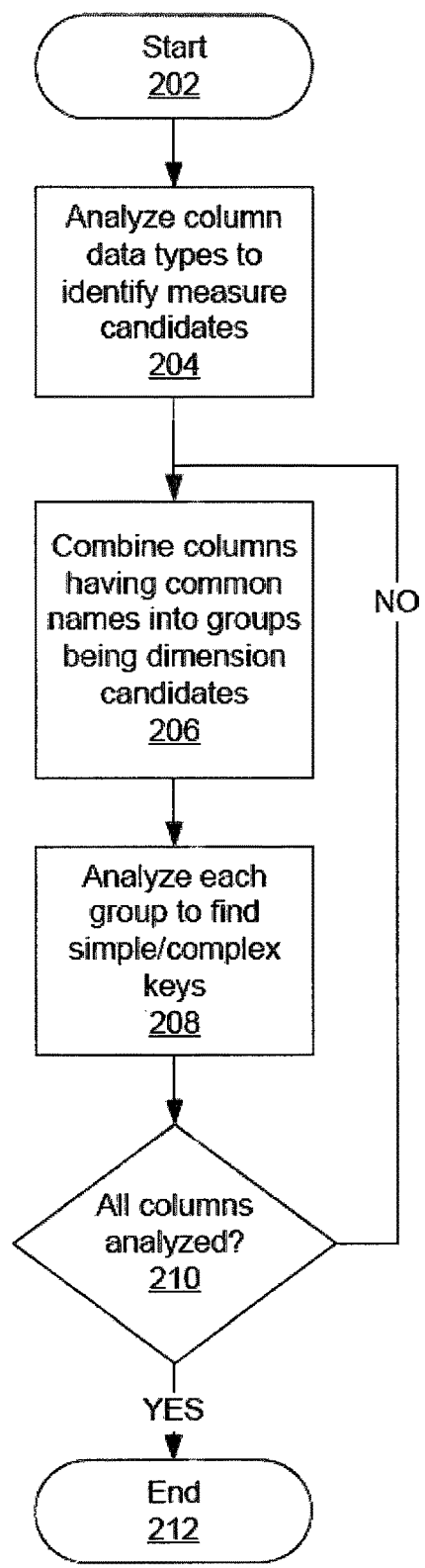
FIG. 2 is a flow chart illustrating the operation of an example algorithm.

A first embodiment of the invention will now be described with reference to the flow chart of FIG. 2. The algorithmic steps depicted in FIG. 2 and described below are implemented by software operating on a general purpose computing system. User interfaces, presented to a user, facilitate uploading source data into source tables and modeling the source table into a normalized form.

In the presently described embodiment source data is analyzed to identify dimensions, facts and joins between identified facts and dimensions. FIG. 2 depicts a high-level, abstract description of an algorithm for modeling a denormalized table into a star schema. Detailed algorithmic processes for implementing the steps depicted in FIG. 2 will be described below.

In process step 202 the algorithm for introspecting a source table is started.

In process step 204 the data type of the data in each column in the source table is examined and columns having data type real number are identified as candidates for being measures in a fact table.

In process step 206 the names of columns in the source table not identified as measure candidates are examined to detect character strings indicating inclusion in typical dimensions. Examples of such character strings are CUST, PROD, PRODUCT, TIME, CUST, and CUSTOMER. Columns having text strings are grouped into dimension candidate groups.

In process step 208 the columns in each dimension candidate group are analyzed to identify simple/complex key candidates.

In process step 210 the algorithm branches back to process step 206 if all columns are not analyzed or advances to process step 212 which ends the algorithm if all columns are analyzed.

An analysis of simple examples will now be presented with reference to FIGS. 3-18. In each example, the algorithm of the presently described embodiment will be applied to a denormalized table and the results of applying the analysis will be presented in a data model interface.

Referring to FIGS. 3 and 4, the source table "Denorm Table Analysis #1" contains a simple dimension where all three columns contain the same common character string "CUST_". In process step 204, the algorithm does not find any columns having data of type real. In process step 206, the algorithm uses all three columns for a dimensions search and the algorithm finds a valid dimension with the common character string "CUST". In process step 208, the algorithm finds the simple key "CUST_KEY". In this example the common character string is "CUST_", but the algorithm filters out the underscore character because it is highly probable that a user will use underscore as a names separator.

Referring to FIGS. 5 and 6, the source table "Denorm Table Analysis #3" depicts a table having a complex key of two tables. In this example embodiment, the algorithm is able to find only complex keys having a maximum of two columns. The algorithm is so limited because the probability of a complex key having more than two columns is low and a large amount of computer resources is required to discover a complex key having more than two columns.

Detailed algorithm steps for determining complex keys are described below.

Figures 7, 8:
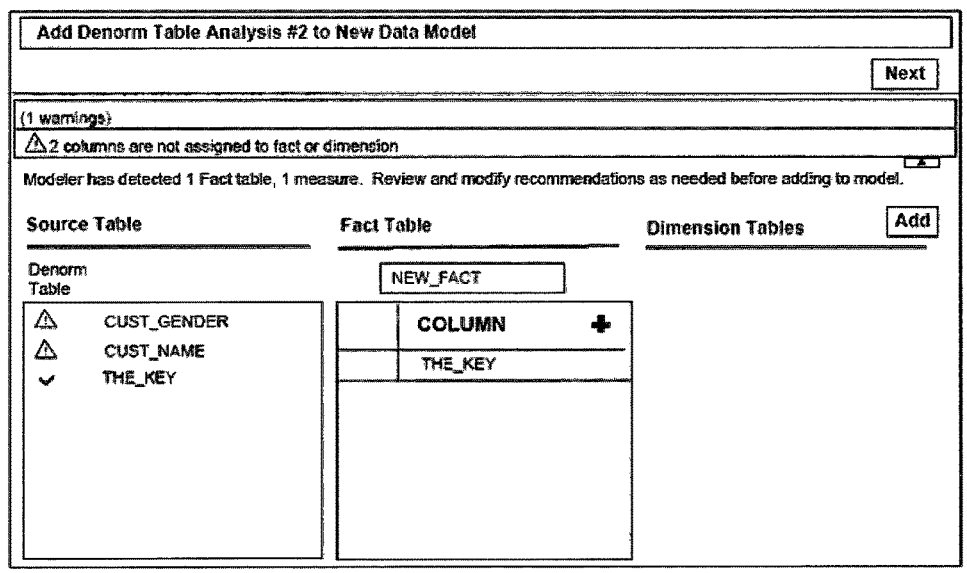

Referring to FIGS. 7 and 8, the source table "Denorm Table Analysis #2" depicts a table that has a different key column name than the table of "Denorm Table Analysis #1" of FIG. 3. In process step 204 the algorithm does not find any columns having data type real. In process step 206 the algorithm finds the group including the "CUST_NAME" and "CUST_GENDER" columns with common text "CUST". But the group does not contain a valid simple key and is not a valid dimension candidate. Therefore all three columns are unused at process step 210 and the algorithm analyzes all of them. Column "THE_KEY" contains only integers, so it can be a measure. Columns "CUST_GENDER" and "CUST_NAME" are character columns, so they cannot be measures.

Referring to FIGS. 9 and 10, the source table "Denorm Table Analysis #10" contains three unique columns: "AIRPORT_ID", "AIRPORT" and "AIPORT_NAME". Accordingly, each column can be a simple key. However, in process step 208 the algorithm detects that "AIPORT_ID" is a simple key because it's more probable that an integer column is a key than that a string column is a key.

In FIG. 11 "AIRPORT" and "AIRPORT_NAME" are simple key candidates and the type for both columns is STRING. The average length of the column entries in "AIRPORT" is avg(AIRPORT)=3 and the average length of the column entries in "AIRPORT_NAME" is avg(AIR-PORT_NAME)=(6+29+9+15+15+36+28)/7=19.7. Accordingly, "AIRPORT" is chosen because avg(AIRPORT)<avg(AIRPORT_NAME).

In this example the algorithm runs the following SQL queries to get the average length of column values. It happens only when dimension contains several columns for key candidates and all columns have string type. So column with lower average length is better candidate: select count (*), sum(LENGTH(COL)) from (select distinct % s COL from % s where % s is not null and rownum<=% d) where rownum<=% d.

Referring to FIGS. 11 and 12, the source table "Denorm Table Analysis #11" contains two unique columns: "AIRPORT" and "AIPORT_NAME". Accordingly, each column can be a simple key. However, the process step 208 of the algorithm detects that "AIPORT" is a simple key because it is more probable that the column with the lowest average column length is a key.

Referring to FIGS. 13 and 14, the source table "Denorm Table Analysis #7" contains a "CUST_BILL" column having data of type real number. Process step 204 identifies the "CUST_BILL" column as a measure and filters the column out because of the high probability that a column having entries of type real is a measure and analysis of additional columns consumes more computer resources. During process step 206 the algorithm finds a valid dimension with a simple key, but the dimension does not contain "CUST_BILL" because that column is identified as a measure.

Referring to FIGS. 15 and 16, the source table "Denorm Table Analysis #8" contains the column "CATEGORY" instead of "CUST_CATEGORY". In process step 202 the algorithm identifies "CUST_BILL" as a measure. In process step 204 the algorithm then finds the dimension "CUST". The algorithm then analyzes the column "CATEGORY" which is unused during process step 206. The column "CATEGORY" contains integer numbers only and it is detected as a measure. Also the column is included in the "CUST" dimension because "CATEGORY" is functionally dependent on "CUST_KEY".

Referring to FIGS. 17 and 18, the source table "Denorm Table Analysis #9" also contains information about a customer's category. In process step 204 the algorithm finds that "CUST_BILL" is a measure. In process step 204 the algorithm then finds that "CUST" and "CATEGORY" are dimensions. The algorithm then analyzes the column "STATUS". The column "STATUS" contains only integers, and it is identified as a measure. Also the column "STATUS" can be included into both "CATEGORY" and "CUST" dimensions, but the dimension "CATEGORY" has the lowest cardinality and the column "STATUS" is included only in "CATEGORY" dimension.

A detailed description of an example algorithm for modeling a denormalized table will now be described with reference to FIGS. 19-25.

The algorithm described below is designed to operate efficiently in a Business Intelligence (BI) cloud services operating environment. The source table may be very large, but in a classical operating environment the database is installed near a web server and communication between the database and web server does not present a problem. However, in a cloud operating environment transferring large amounts of data to the web server for analysis ties up cloud bandwidth and computing resources.

In one example embodiment, the source table is stored in a database and the introspection algorithm application is deployed on a weblogic server, for example a JAVA Virtual Machine (JVM)). The source table is not transferred to the JVM runtime memory. Instead, the introspection algorithm runs simple SQL queries against only a limited number of rows of the source table required for accurate analysis. The entire source table is not analyzed. In a cloud operating environment, the analysis of all rows of a very large table is very time consuming. Collecting information from only a limited number of rows yields accurate results and avoids tying up cloud resources.

Statistic collection (e.g., cardinality evaluation, average length) is done by database software and only query results are transferred from the database to the JVM memory and collected statistics analysis is done by the JVM introspection algorithm application.

Figure 19:
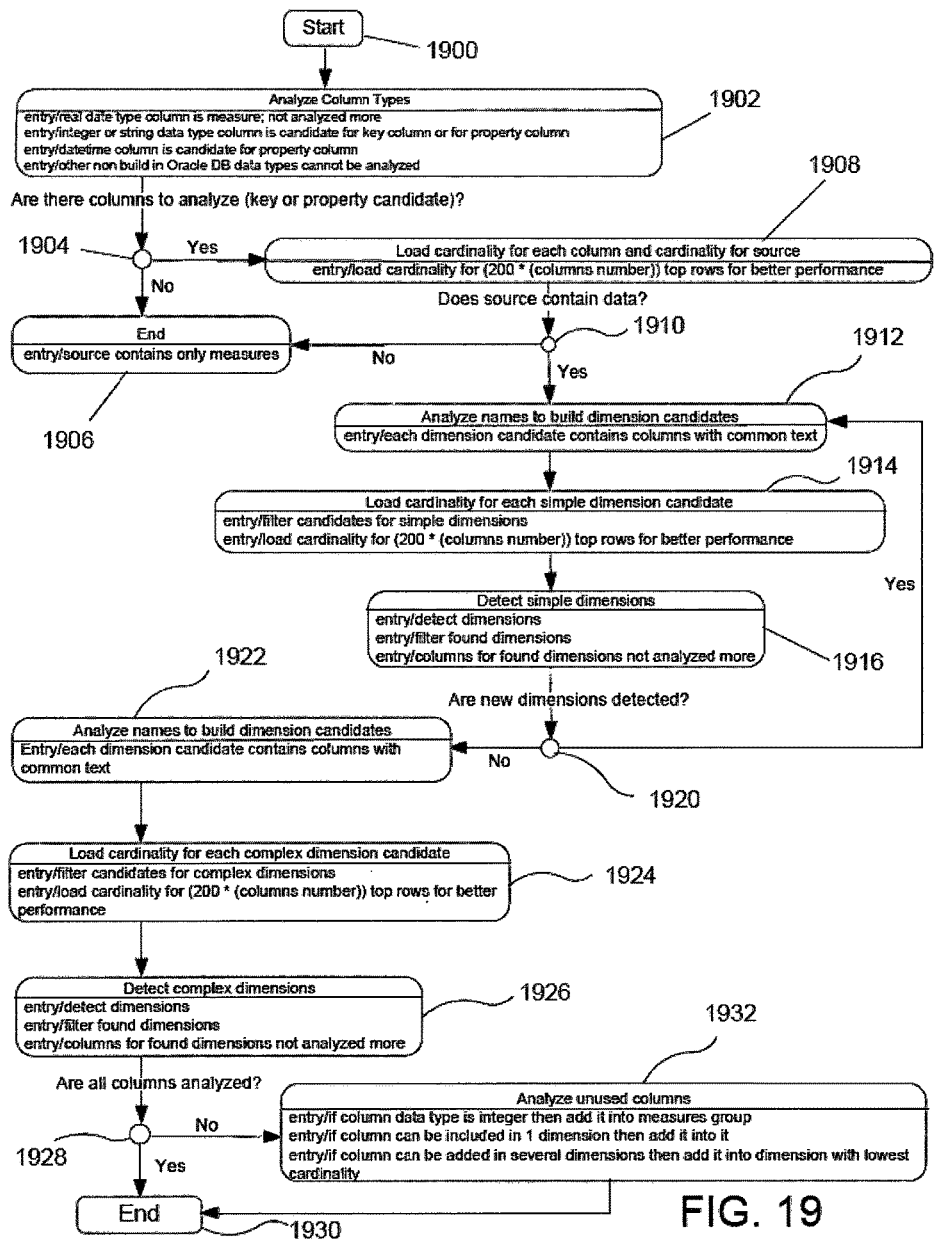
FIG. 19 is a flow chart illustrating the operation of an example embodiment.

FIG. 19 is a flow chart listing the steps of the algorithm. In the following description, examples illustrating the operation of the algorithm will refer to a table entitled "BICS_REVENUE_FT2" which has the following columns: BICS_REVENUE_FT2, Column Names, ADDRESS1, ADDRESS2, AREA, CHANNEL_NAME, CITY, COUNTRY_CODE, COUNTRY_NAME, CUST_BIRTH_DT, CUST_CRDT_RATE, CUST_GENDER, CUST_MARITAL_STATUS, CUST_NAME, CUST_SEGMENT, CUST_ TYPE, ORDER_STATUS, POSTAL_CODE, PRODUCT, PROD_BRAND, PROD_ITEM_DSC, PROD_ITEM_KEY, PROD_LOB, PROD_TYPE, REGION, STATE_PROV, TIME_BILL_DT, TIME_PAID_DT, ADDR_KEY, COST_FIXED, COST_VARIABLE, CUST_NUMBER, DISCNT_VALUE, ORDER_KEY, REVENUE, and UNITS.

In process step 1900 the algorithm starts.

In process step 1902 the data types of each column of the source table are analyzed. Columns with real data types are measure columns. Once a column is identified as a measure it is not analyzed again in the following process steps to conserve computer resources.

Columns with integer or string data types are candidates for key or property columns, columns with datetime data types are candidates for property columns and other data types cannot be analyzed.

Process step 1904 is a decision block. If there are no key or property candidate columns identified in process step 1902 then control moves to process block 1906; if key or property candidate columns are identified in process step 1902 then control moves to process block 1908.

If there are no key or property candidate columns to be analyzed then all columns in the source table are measure columns and the algorithm ends at process step 1906.

If there are key or property candidate columns to be analyzed then in process step 1908 the cardinality of each key or property candidate column is loaded. The term cardinality refers to the uniqueness of data values contained in a particular column (attribute) of a database table. The lower the cardinality, the more duplicated elements in a column. Thus, a column with the lowest possible cardinality would have the same value for every row. In this example process the cardinality of only the top 200*(number of columns in the source table) rows are analyzed to improve performance.

Structured Query Language (SQL) queries are used to find cardinality. Note that the SQL query "select count (distinct column1) from table" does not calculate NULL values and output will be incorrect in such case. The SQL query used to determine cardinality of a column is: card (column1)=select count(*) from (select distinct column1 from table). The SQL query used to determine cardinality of entries in a multi-column, e.g., two-column) table is: card (column1, column2)=select count(*) from (select distinct column1, column2 from table).

Process step 1910 is a decision block. If the source table does not contains data the control passes to process block 1906 and the process ends. If the source table contains data the control passes to process block 1912.

In process step 1912 the algorithm analyzes the names of columns based on common character strings, common character position and word separation characters to build dimension candidate groups of columns. Each dimension candidate group contains columns with common character strings. The algorithm first finds all different groups with common character strings, then filters found groups based on word separation character usages, such as the underscore, in common character strings and then filters the groups based on common character string position.

Three different example groups which are found during this step are:

First Group: PROD_=[PROD_LOB, PROD_TYPE, PROD_BRAND, PROD_ITEM_KEY, PROD_ITEM_DSC]

Second Group: PROD=[PROD_LOB, PROD_TYPE, PROD_BRAND, PROD_ITEM_KEY, PROD_ITEM_DSC, PRODUCT]

Third Group: _ITEM_=[PROD_ITEM_KEY, PROD_ITEM_DSC]

The first group results from searching on the combination of the character string "PROD" and the underscore symbol and the second group results from searching on only the character string "PROD". These groups turn out to be the same. The third group results from searching on the character string "ITEM" preceded and followed by the underscore symbol. Note that the third group is a subset of both the first and second groups.

In process step 1914 the algorithm loads the cardinality for each simple dimension candidate group. The cardinality of the combined columns in each dimension candidate group is determined.

The algorithm constructs the following query to analyze the cardinalities of the first, second and third groups: select 0,count(*) from (select distinct "PROD_LOB", "PROD_BRAND", "PROD_TYPE", "PROD_ITEM_KEY", "PROD_ITEM_DSC" from "BICS_REVENUE_FT2" where rownum<=6800) union all select 1,count(*) from (select distinct "PROD_ITEM_KEY", "PROD_ITEM_DSC" from "BICS_REVENUE_FT2" where rownum<=6800) union all select 2,count(*) from (select distinct "PROD_LOB", "PROD_BRAND", "PROD_TYPE", "PROD_ITEM_KEY", "PROD_ITEM_DSC", "PRODUCT" from "BICS_REVENUE_FT2" where rownum<=6800).

In this example process the cardinality of only the top 200*(number of columns in the source table) rows are analyzed to improve performance.

In process step 1916 the column and cardinalities of the candidate dimension groups are analyzed to detect simple dimensions. This analysis is based on the fact that the key column cardinality must be equal to the group cardinality. A group for which a simple key is found is designated a simple dimension.

Algorithm steps for determining the simple key of a group are illustrated with reference to FIG. 20 that depicts a table "DATASET" including columns "CUST_KEY", "CUST_NAME" and "CUST_GENDER".

For the table "DATASET" a simple key can be determined using the following SQL query requests: card(CUST_KEY, CUST_NAME, CUST_GENDER)=7; AND card (CUST_KEY)=7; card (CUST_NAME)=4; card (CUST_GENDER)=1.

Therefore "CUST_KEY" is a simple key because the cardinality of "CUST_KEY" and the cardinality of all the columns of "DATASET" are the same, in this case card=7. Only two SQL queries are required to determine the simple key.

In process step 1916 simple dimensions are filtered to remove duplicates and subsets. Duplicate simple dimensions have the same key. A first dimension is a subset of a second dimension if the second dimension contains all the columns of the first dimension.

After duplicates and subsets are filtered the algorithm finds the maximum disjoint set and removes excess dimensions.

A first example will illustrate filtering duplicate and excessive dimensions. The following seven groups are identified in a source table named "AIRLINE_TRAFFIC" with group names: "ROUTE", "ROU", "ION", "DISTANCE", "DEP", "DEST" and "ORIG".

{source: AIRLINE_TRAFFIC; name: ROUTE; columns: [ROUTE, ROUTE_DESCRIPTION]; uniqueColumns: [ROUTE]; key: [ROUTE]}

{source: AIRLINE_TRAFFIC; name: ROU; columns: [DISTANCE_GROUP, ROUTE, ROUTE_DESCRIPTION]; uniqueColumns: [ROUTE]; key: [ROUTE]}

{source: AIRLINE_TRAFFIC; name: ION; columns: [DEST_DIVISION_NAME, ORIG_REGION_NAME, ROUTE_DESCRIPTION, ORIG_DIVISION_NAME]; uniqueColumns: [ROUTE_DESCRIPTION]; key: [ROUTE_DESCRIPTION]}

{source: AIRLINE_TRAFFIC; name: DISTANCE; columns: [DISTANCE_GROUP, DISTANCE_CLASS]; uniqueColumns: [DISTANCE_GROUP]; key: [DISTANCE_GROUP]}

{source: AIRLINE_TRAFFIC; name: DEP; columns: [DEP_MONTH, DEP_DAY, DEP_YEAR]; uniqueColumns: [DEP_MONTH, DEP_DAY]; key: [DEP_MONTH]}

{source: AIRLINE_TRAFFIC; name: DEST; columns: [DEST_AIRPORT, DEST_US_STATE_NAME, DEST_DIVISION_NAME, DEST_CITY_NAME, DEST_AIRPORT_NAME]; uniqueColumns: [DEST_AIRPORT, DEST_AIRPORT_NAME]; key: [DEST_AIRPORT]}

{source: AIRLINE_TRAFFIC; name: ORIG; columns: [ORIG_AIRPORT_NAME, ORIG_AIRPORT, ORIG_REGION_NAME, ORIG_CITY_NAME, ORIG_US_STATE_NAME, ORIG_DIVISION_NAME]; uniqueColumns: [ORIG_AIRPORT_NAME, ORIG_AIRPORT]; key: [ORIG_AIRPORT]}

In this example, the dimension candidate "ION" is excessive because all the columns included in "ION" are present in one of the other groups.

Also, in this example, the dimension candidates "ROU" and "ROUTE" are duplicate dimensions because they both have the same key. In this example, the algorithm filters out the "ROU" candidate group for the following reasons. First, it is more difficult to find a dimension candidate group with a greater common character length and, second, it is more probable that the user consciously defined a dimension with the longer common character length.

The output of the algorithm after filtering is:

{source: AIRLINE_TRAFFIC; name: ROUTE; columns: [ROUTE, ROUTE_DESCRIPTION]; uniqueColumns: [ROUTE]; key: [ROUTE]}

{source: AIRLINE_TRAFFIC; name: DISTANCE; columns: [DISTANCE_GROUP, DISTANCE_CLASS]; uniqueColumns: [DISTANCE_GROUP]; key: [DISTANCE_GROUP]}

{source: AIRLINE_TRAFFIC; name: DEP; columns: [DEP_MONTH, DEP_DAY, DEP_YEAR]; uniqueColumns: [DEP_MONTH, DEP_DAY]; key: [DEP_MONTH]}

{source: AIRLINE_TRAFFIC; name: DEST; columns: [DEST_AIRPORT, DEST_US_STATE_NAME, DEST_DIVISION_NAME, DEST_CITY_NAME, DEST_AIRPORT_ NAME]; uniqueColumns: [DEST_AIRPORT, DEST_AIRPORT_NAME]; key: [DEST_AIRPORT]}

{source: AIRLINE_TRAFFIC; name: ORIG; columns: [ORIG_AIRPORT_NAME, ORIG_AIRPORT, ORIG_REGION_NAME, ORIG_CITY_NAME, ORIG_US_STATE_NAME, ORIG_DIVISION_NAME]; uniqueColumns: [ORIG_AIRPORT_NAME, ORIG_AIRPORT]; key: [ORIG_AIRPORT]}

Columns included in found dimension are not further analyzed.

A second example illustrates two iterations to identify sub-dimensions. The following seven groups are identified by the first iteration of the dimension candidate group search of the source table named "BICS_REVENUE" with group names "ORDER", "CUST", "DER", "KEY", "ADDR", "ITEM" and "COUNTRY".

{source: BICS_REVENUE_FT2; name: ORDER; columns: [ORDER_KEY, ORDER_STATUS]; uniqueColumns: [ORDER_KEY]; key: [ORDER_KEY]}

{source: BICS_REVENUE_FT2; name: CUST; columns: [CUST_NAME, CUST_MARITAL_STATUS, CUST_BIRTH_DT, CUST_NUMBER, CUST_GENDER, CUST_CRDT_RATE, CUST_TYPE, CUST_SEGMENT]; uniqueColumns: [CUST_NAME, CUST_NUMBER]; key: [CUST_NUMBER]}

{source: BICS_REVENUE_FT2; name: DER; columns: [ORDER_KEY, ORDER_STATUS, CUST_GENDER]; uniqueColumns: [ORDER_KEY]; key: [ORDER_KEY]}

{source: BICS_REVENUE_FT2; name: KEY; columns: [ORDER_KEY, PROD_ITEM_KEY, ADDR_KEY]; uniqueColumns: [ORDER_KEY]; key: [ORDER_KEY]}

{source: BICS_REVENUE_FT2; name: ADDR; columns: [ADDRESS2, ADDRESS1, ADDR_KEY]; uniqueColumns: [ADDR_KEY]; key: [ADDR_KEY]}

{source: BICS_REVENUE_FT2; name: ITEM; columns: [PROD_ITEM_KEY, PROD_ITEM_DSC]; uniqueColumns: [PROD_ITEM_KEY, PROD_ITEM_DSC]; key: [PROD_ITEM_KEY]}

{source: BICS_REVENUE_FT2; name: COUNTRY; columns: [COUNTRY_CODE, COUNTRY_NAME]; uniqueColumns: [COUNTRY_CODE, COUNTRY_NAME]; key: [COUNTRY_CODE]}

The duplicate dimensions are "DER", "ORDER" and "KEY" because they have the same key. Since the average length of the column entries in "ORDER" is greater than the average length of the column entries in "DER" and in "KEY" and algorithm filters out the "DER" and "KEY" dimension candidate groups.

The output after filtering is:

{source: BICS_REVENUE_FT2; name: ORDER; columns: [ORDER_KEY, ORDER_STATUS]; uniqueColumns: [ORDER_KEY]; key: [ORDER_KEY]}

{source: BICS_REVENUE_FT2; name: CUST; columns: [CUST_NAME, CUST_MARITAL_STATUS, CUST_BIRTH_DT, CUST_NUMBER, CUST_GENDER, CUST_CRDT_RATE, CUST_TYPE, CUST_SEGMENT]; uniqueColumns: [CUST_NAME, CUST_NUMBER]; key: [CUST_NUMBER]}

{source: BICS_REVENUE_FT2; name: ADDR; columns: [ADDRESS2, ADDRESS1, ADDR_KEY]; uniqueColumns: [ADDR_KEY]; key: [ADDR_KEY]}

{source: BICS_REVENUE_FT2; name: ITEM; columns: [PROD_ITEM_KEY, PROD_ITEM_DSC]; uniqueColumns: [PROD_ITEM_KEY, PROD_ITEM_DSC]; key: [PROD_ITEM_KEY]}

{source: BICS_REVENUE_FT2; name: COUNTRY; columns: [COUNTRY_CODE, COUNTRY_NAME]; uniqueColumns: [COUNTRY_CODE, COUNTRY_NAME]; key: [COUNTRY_CODE]}

A second iteration of the simple dimension candidate search identifies two dimension candidate group with names "PROD_" and "PROD". The output of the search is:

{source: BICS_REVENUE_FT2; name: PROD_; columns: [PROD_LOB, PROD_TYPE, PROD_BRAND]; uniqueColumns: [PROD_TYPE]; key: [PROD_TYPE]}

{source: BICS_REVENUE_FT2; name: PROD; columns: [PROD_LOB, PROD_TYPE, PROD_BRAND, PRODUCT]; uniqueColumns: [PRODUCT]; key: [PRODUCT]}

In this example the dimension candidate group "PROD_" is a sub-dimension of "PROD" because all of its columns are included in "PROD". The algorithm filters out "PROD_" and the filtered output is:

{source: BICS_REVENUE_FT2; name: PROD; columns: [PROD_LOB, PROD_TYPE, PROD_BRAND, PRODUCT]; uniqueColumns: [PRODUCT]; key: [PRODUCT]}

Process step 1920 is a decision block. If a simple dimension is found during the last iteration of process steps 1912-1916 the control passes back to process step 1912. If no simple dimension is found control passes to process step 1922.

In process step 1922 names of columns not included in simple dimensions are analyzed again to build complex dimension candidate groups as in process step 1912.

In process step 1924 the cardinality of each complex dimension candidate group is loaded and the candidate groups are filtered using the algorithmic steps described above with reference to process step 1914.

In process step 1926 the column and group cardinalities are analyzed to determine complex keys for the dimension candidate groups that are not simple dimensions. Groups having complex keys are designated as complex dimensions.

The algorithmic steps for determining a complex key will now be described with reference to the table "GENDER" depicted in FIG. 21.

In "GENDER" the cardinalities of the entire table and each column are: card(KEY, NAME, TYPE, GENDER)=12; card(KEY)=6; card(NAME)=4; card(TYPE)=3; card(GENDER)=2.

A complex key formed from two columns must have the cardinality of the entire group. The cardinalities of each combination of two columns are: card(NAME, TYPE)=12; card(KEY, TYPE)=10; card(KEY, NAME)=8; card(KEY, GENDER)=6.

Accordingly, the column pair of NAME and TYPE can function as a complex key because the combined cardinality of the pair of columns is the same as the group cardinality.

Process step 1928 is a decision block. If all columns have been analyzed then control passes to process block 1930 and the process ends. If all columns have not been analyzed then control passes to process block 1932.

In process step 1932 columns not included in any simple or complex dimensions are analyzed. Integer columns are added to measures but not removed from analysis. If an unused column is functionally dependent on a dimension key of only a particular dimension candidate group then the algorithm adds the unused column to that particular dimension candidate group. If an unused column can be added to several dimension candidate group then the algorithm adds the unused column to the dimension candidate group with the lowest cardinality.

To understand whether an unused analyzed column is functionally dependent upon a key the algorithm loads the cardinality for a group formed of the key columns and the unused analyzed column. For example, a first dimension candidate group has columns (CUST_KEY, CUST_NAME, CUST_GENDER) and a simple key "CUST_KEY". The algorithm analyzes the unused column "CATEGORY" to determine whether to add it to the first dimension category group. If CATEGORY is functionally dependent upon CUST_KEY then card(CUST_KEY, CATEGORY)=card (CUST_KEY) and the column "CATEGORY" is added to the first dimension candidate group.

A similar analysis is done for case where the first dimension candidate group has a complex key (CUST_KEY, CUST_NAME). In this case, if CATEGORY is functionally dependent upon (CUST_KEY, CUST_NAME) then card (CUST_KEY, CUST_NAME, CATEGORY)=card(CUST_KEY, CUST_NAME) and the column "CATEGORY" is added to the first dimension candidate group.

When process step 1932 completes control is passed to process step 1930 and the process ends.

As a result of applying the process steps of FIG. 19 to the table "BICS_REVENUE_FT2", the recommended measures are UNITS, COST_VARIABLE, REVENUE, COST_FIXED, DISCNT_VALUE and the recommended dimensions are: (1) name: ADDR; columns: [ADDRESS2, ADDRESS1, ADDR_KEY, POSTAL_CODE, CITY, STATE_PROV]; uniqueColumns: [ADDR_KEY]; key: [ADDR_KEY]; (2) name: ORDER; columns: [UNITS, ORDER_KEY, ORDER_STATUS, TIME_BILL_DT, TIME_PAID_DT, CHANNEL_NAME]; uniqueColumns: [ORDER_KEY]; key: [ORDER_KEY]; (3) name: COUNTRY; columns: [AREA, COUNTRY_CODE, REGION, COUNTRY_NAME]; uniqueColumns: [COUNTRY_CODE, COUNTRY_NAME]; key: [COUNTRY_CODE]; (4) name: CUST; columns: [CUST_NAME, CUST_MARITAL_STATUS, CUST_BIRTH_DT, CUST_NUMBER, CUST_GENDER, CUST_CRDT_RATE, CUST_TYPE, CUST_SEGMENT]; uniqueColumns: [CUST_NAME, CUST_NUMBER]; key: [CUST_NUMBER]; and (5) name: PROD; columns: [PROD_LOB, PROD_TYPE, PROD_BRAND, PRODUCT]; uniqueColumns: [PRODUCT]; key: [PRODUCT].

In an example embodiment, the software system generates display data for presenting user interfaces allowing a user to review the recommended measures candidates, dimension candidates and key candidates and to modify recommendations as necessary.

FIG. 22 depicts a review user interface 2200 presenting the fact and dimension tables recommended after applying the process steps of FIG. 19 to the table "BICS_REVENUE_FT2". The review user interface 2200 displays several windows.

A name window 2202 shows the name of the table that has been analyzed and a comment window 2204 summarizes the results of the analysis.

A source table window 2206 lists the column names of the source table and shows a check mark next to columns that are included in recommended facts or dimensions. If a column cannot be analyzed and is not included in a recommended fact or dimension table then a warning symbol instead of a check is displayed next to the column and a warning is included in the comment window.

A fact table window 2208 shows the name of the fact table, the measure column candidate names and check marks next to foreign keys in the fact table that reference the primary keys of the dimensions tables.

The dimension tables window 2210 shows names of the recommended dimension candidates, the column names included in each dimension candidate and check marks next to simple/complex key candidates.

If the information to be displayed in a given window exceeds the size of the window scroll bars are displayed to allow scrolling to view all the information.

The review user interface 2200 includes a next control button to review the next table analyzed and an add button to add the currently shown table to the data model.

Figure 23:
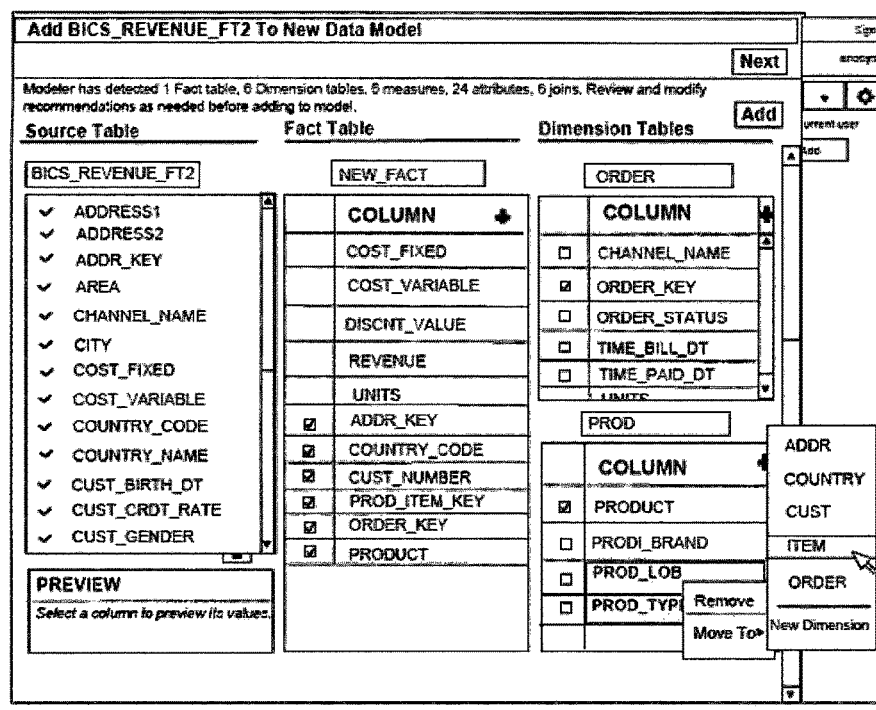

The review user user 2200 also facilitates user interaction to edit and change the contents of the recommended tables. As depicted in FIGS. 23 and 24, the review user interface 2200 is responsive to input signals to allow selecting column candidates and using drop down menus 2310 depicting actions to remove or move selected columns to an existing or new dimension.

In FIG. 24 columns "PROD_LOB" and "PROD_TYPE" are shown removed from the FIG. 23 dimension "PROD" and added into the dimension "ITEM".

Figure 25:
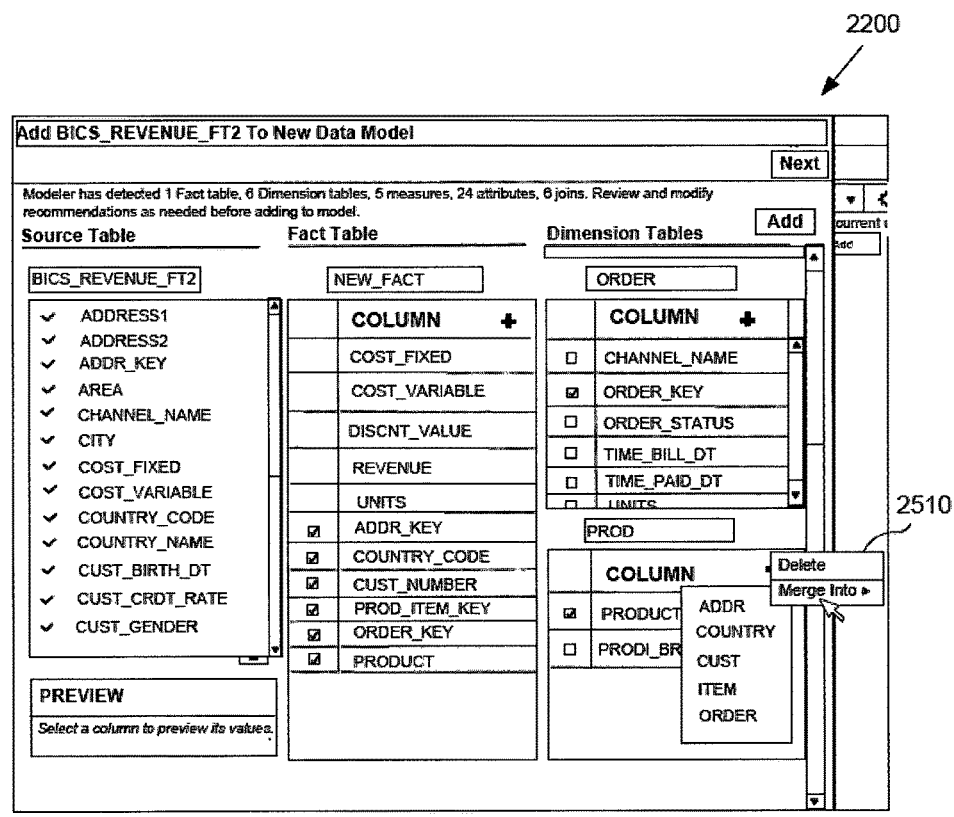

The review user interface 2200 also facilitates user interaction to merge one recommended dimension into another. In FIG. 25, the review user interface 2200 is responsive to input signals to select a dimension table display drop down menu 2510 depicting actions to merge a selected dimension into another dimension.

In FIG. 26 the dimension "PROD" is shown removed and all columns moved into the dimension "ITEM".

Figure 27:
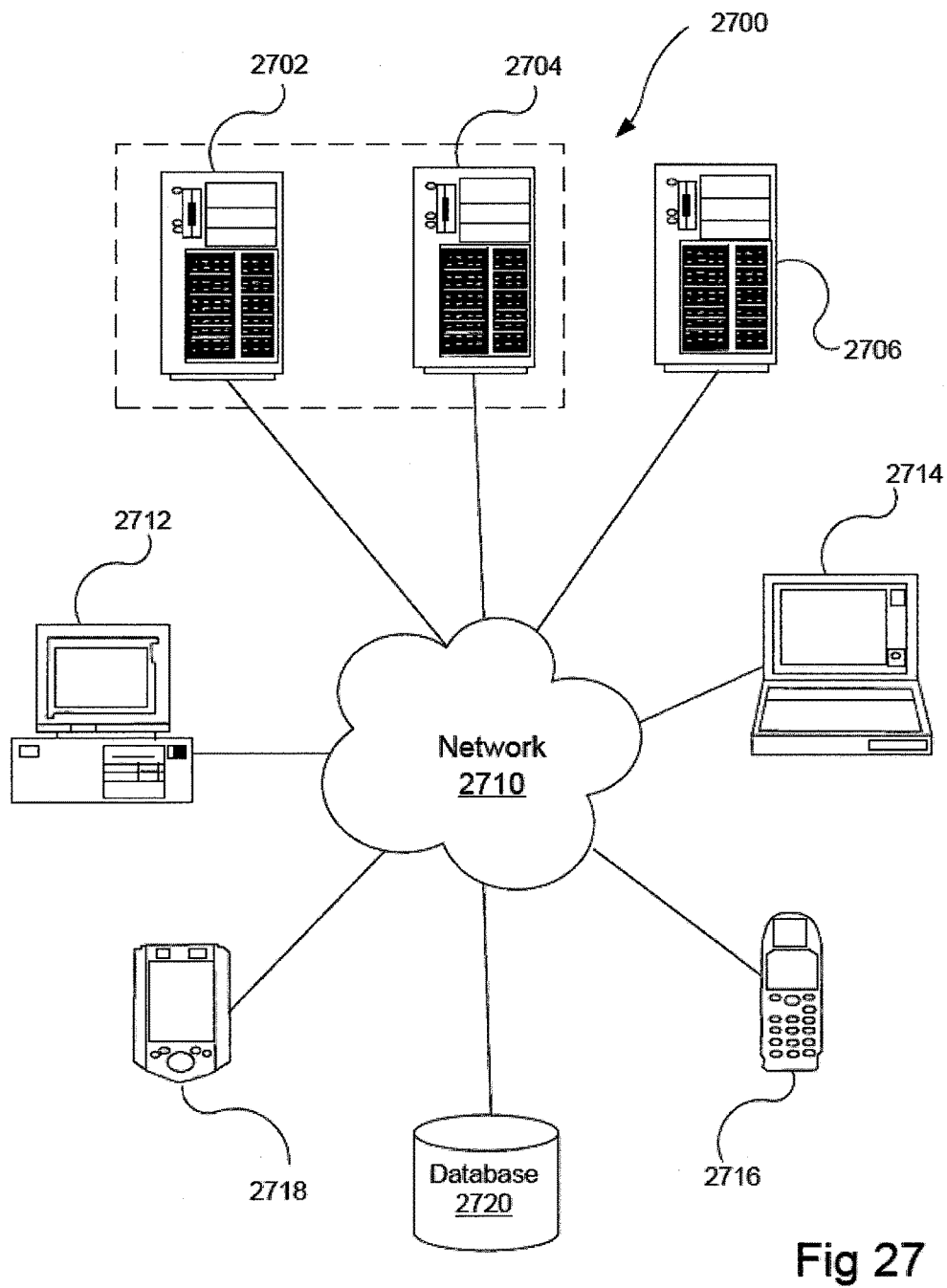
FIG. 27 is a block diagram illustrating components of an example operating environment in which various embodiments of the present invention may be implemented.

FIG. 27 is a block diagram illustrating components of an example operating environment in which various example embodiments may be implemented. The system 2700 can include one or more user computers, computing devices, or processing devices 2712, 2714, 2716, 2718, which can be used to operate a client, such as a dedicated application, web browser, etc. The user computers 2712, 2714, 2716, 2718 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 2712, 2714, 2716, 2718 may also have any of a variety of applications, including one or more development systems, database client and/or server applications, and Web browser applications. Alternatively, the user computers 2712, 2714, 2716, 2718 may be any other electronic device, such as a thin-client computer, Internet-enabled gaming system, and/or personal messaging device, capable of communicating via a network (e.g., the network 2710 described below) and/or displaying and navigating Web pages or other types of electronic documents. Although the example system 2700 is shown with four user computers, any number of user computers may be supported.

In most embodiments, the system 2700 includes some type of network 2710. The network may be any type of network familiar to those skilled in the art that can support data communications using any of a variety of commercially-available protocols, including without limitation TCP/IP, SNA, IPX, AppleTalk, and the like. Merely by way of example, the network 2710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 2702, 2704, 2706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 2706) may be dedicated to running applications, such as a business application, a Web server, application server, etc. Such servers may be used to process requests from user computers 2712, 2714, 2716, 2718. The applications can also include any number of applications for controlling access to resources of the servers 2702, 27027, 2706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 2712, 2714, 2716, 2718. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 2712, 2714, 2716, 2718.

The system 2700 may also include one or more databases 2720. The database(s) 2720 may reside in a variety of locations. By way of example, a database 2720 may reside on a storage medium local to (and/or resident in) one or more of the computers 2702, 2704, 2706, 2712, 2714, 2716, 2718. Alternatively, it may be remote from any or all of the computers 2702, 2704, 2706, 2712, 2714, 2716, 2718, and/or in communication (e.g., via the network 2710) with one or more of these. In a particular set of embodiments, the database 2720 may reside in a storage-area network ("SAN") familiar to those skilled in the art. Similarly, any necessary files for performing the functions attributed to the computers 2702, 2704, 2706, 2712, 2714, 2716, 2718 may be stored locally on the respective computer and/or remotely, as appropriate. In one set of embodiments, the database 2720 may be a relational database, such as Oracle 10 g, that is adapted to store, update, and retrieve data in response to SQL-formatted commands.

Figure 28:
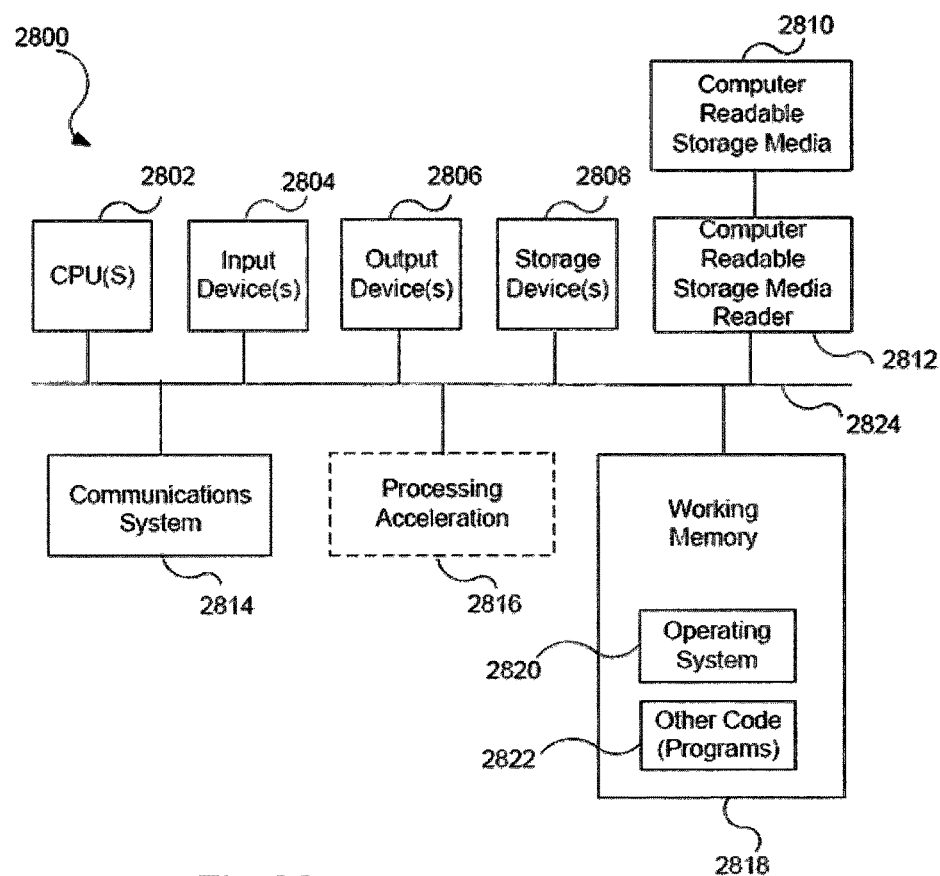
FIG. 28 illustrates an example computer system in which various embodiments of the present invention may be implemented.

FIG. 28 illustrates an example computer system 2800, in which various example embodiments may be implemented. The system 2800 may be used to implement any of the computer systems described above. The computer system 2800 is shown comprising hardware elements that may be electrically coupled via a bus 2824. The hardware elements may include one or more central processing units (CPUs) 2802, one or more input devices 2804 (e.g., a mouse, a keyboard, etc.), and one or more output devices 2806 (e.g., a display device, a printer, etc.). The computer system 2800 may also include one or more storage devices 2808. By way of example, the storage device(s) 2808 can include devices such as disk drives, optical storage devices, solid-state storage devices such as a random access memory ("RAM") and/or a read-only memory ("ROM"), which can be programmable, flash-updateable and/or the like.

The computer system 2800 may additionally include a computer-readable storage media reader 2812, a communications system 2814 (e.g., a modem, a network card (wireless or wired), an infra-red communication device, etc.), and working memory 2818, which may include RAM and ROM devices as described above. In some embodiments, the computer system 2800 may also include a processing acceleration unit 2816, which can include a digital signal processor DSP, a special-purpose processor, and/or the like.

The computer-readable storage media reader 2812 can further be connected to a computer-readable storage medium 2810, together (and, optionally, in combination with storage device(s) 2808) comprehensively representing remote, local, fixed, and/or removable storage devices plus storage media for temporarily and/or more permanently containing computer-readable information. The communications system 2814 may permit data to be exchanged with the network and/or any other computer described above with respect to the system 2800.

The computer system 2800 may also comprise software elements, shown as being currently located within a working memory 2818, including an operating system 2820 and/or other code 2822, such as an application program (which may be a client application, Web browser, mid-tier application, RDBMS, etc.). It should be appreciated that alternate embodiments of a computer system 2800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

We claim:

1. A method, performed by one or more processors of a web server, comprising the steps of:
identifying columns of a source table having entries of data type "real" as measure column candidates, with the source table stored in an external database coupled to the web server by a network, and with the source table including a plurality of rows and columns with each column having a multi-character name and having one or more entries, with entries in a single column constrained to being of a single data type and with each column having a cardinality value equal to the number of distinct entries in the column;
combining non-measure column candidates identified as having names including a common character string into a dimension candidate group;
running one or more structured query language (SQL) statements to determine a column cardinality value of each single column in the dimension candidate group and a group cardinality value of all the columns in the dimension candidate group;
designating each single column having a column cardinality value equal to the group cardinality value as a simple key candidate column;
executing one or more structured query language (SQL) statements to determine a column-pair cardinality value of each pair of columns in the dimension candidate group if no simple key candidate exists;
designating a pair of columns in the dimension candidate group having a column-pair cardinality value equal to the group cardinality value as a complex key candidate pair of columns of the dimension candidate group;
grouping measure column candidates and keys of dimension candidate groups to form a candidate fact table; and
identifying a plurality of different dimension candidate groups with key candidate columns, with each dimension candidate group including columns having names including a common character string and one of the key candidate columns, wherein a first subset of the key candidate columns are simple key candidate columns and a second subset of the key candidate columns are complex key candidate columns.

2. The method of claim 1 further comprising the step of:
determining a column cardinality value based on a limited number of rows of the source table.

3. The method of claim 1 further comprising the step of:
determining a group cardinality value based on a limited number of rows of the source table.

4. The method of claim 1 further comprising the step of:
determining a column-pair cardinality value based on a limited number of rows of the source table.

5. The method of claim 1 further comprising:
identifying a column having data type integer and not identified as a measure or included in a dimension candidate group as a measure column candidate.

6. The method of claim 1 further comprising:
identifying the plurality of different dimension candidate groups, with each dimension candidate group including columns having names including a common character string and a key candidate pair of columns.

7. The method of claim 6 further comprising:
adding a column that is functionally dependent on a key of a particular dimension candidate group in the plurality of dimension candidate groups and not identified as a measure or included in any dimension candidate group of the plurality to the particular dimension group.

8. The method of claim 1 further comprising:
adding a column that is functionally dependent on keys of a subset of the dimension candidate groups in the plurality of dimension candidate groups and not identified as a measure or included in any dimension candidate group of the plurality to the dimension candidate group in the subset having the lowest cardinality.

9. The method of claim 1 further comprising:
for one or more discovered simple key candidate columns of the dimension candidate group, selecting a simple key candidate column having a lowest average length of the column entries as a simple primary key.

10. The method of claim 6 further comprising:
eliminating duplicate dimension candidate groups;
eliminating a dimension candidate group that is a subgroup of another dimension candidate group; and
eliminating excessive dimension candidate groups.

11. The method of claim 1 further comprising:
for one or more discovered simple key candidate columns of a dimension candidate group, selecting a simple key candidate column having entries of type integer as a simple key column.

12. The method of claim 1 further comprising:
moving, in response to input signals, a selected column from a first to a second dimension candidate group.

13. The method of claim 1 further comprising:
merging, in response to input signals, a first dimension candidate group into a second dimension candidate group.

14. One or more non-transitory computer readable storage media storing program code for execution by one or more processors included in web server, where the program code, when executed by the one or more processors, performs the following acts:
identifying columns of a source table having entries of data type "real" as measure column candidates, with the source table stored in an external database coupled to the web server by a network, and with the source table including a plurality of rows and columns with each column having a multi-character name and having one or more entries, with entries in a single column constrained to being of a single data type and with each column having a cardinality value equal to the number of distinct entries in the column;
combining non-measure column candidates identified as having names including a common character string into a dimension candidate group;
running one or more structured query language (SQL) statements to determine a column cardinality value of each single column in the dimension candidate group and a group cardinality value of all the columns in the dimension candidate group;
designating each single column having a column cardinality value equal to the group cardinality value as a simple key candidate column;
executing one or more structured query language (SQL) statements to determine a column-pair cardinality value of each pair of columns in the dimension candidate group if no simple key candidate exists;
designating a pair of columns in the dimension candidate group having a column-pair cardinality value equal to the group cardinality value as a complex key candidate pair of columns of the dimension candidate group;
grouping measure column candidates and keys of dimension candidate groups to form a candidate fact table; and
identifying a plurality of different dimension candidate groups with key candidate columns, with each dimension candidate group including columns having names including a common character string and one of the key candidate columns, wherein a first subset of the key candidate columns are simple key candidate columns and a second subset of the key candidate columns are complex key candidate columns.

15. The one or more non-transitory computer readable storage media of claim 14 with the program code, when executed by the one or more processors, further performing the act of:
determining a column cardinality value based on a limited number of rows of the source table.

16. The one or more non-transitory computer readable storage media of claim 14 with the program code, when executed by the one or more processors, further performing the act of:
determining a group cardinality value based on a limited number of rows of the source table.

17. The one or more non-transitory computer readable storage media of claim 14 with the program code, when executed by the one or more processors, further performing the act of:
determining a column-pair cardinality value based on a limited number of rows of the source table.

18. The one or more non-transitory computer readable storage media of claim 14 with the program code, when executed by the one or more processors, further performing the act of:
identifying a column having data type integer and not identified as a measure or included in a dimension candidate group as a measure column candidate.

19. The one or more non-transitory computer readable storage media of claim 14 with the program code, when executed by the one or more processors, further performing the act of:
identifying the plurality of different dimension candidate groups, with each dimension candidate group including columns having names including a common character string and a key candidate pair of columns.

20. The one or more non-transitory computer readable storage media of claim 19 with the program code, when executed by the one or more processors, further performing the act of:
adding a column that is functionally dependent on a key of a particular dimension candidate group in the plurality of dimension candidate groups and not identified as a measure or included in any dimension candidate group of the plurality to the particular dimension group.

21. The one or more non-transitory computer readable storage media of claim 14 with the program code, when executed by the one or more processors, further performing the act of:
adding a column that is functionally dependent on keys of a subset of the dimension candidate groups in the plurality of dimension candidate groups and not identified as a measure or included in any dimension candidate group of the plurality to the dimension candidate group in the subset having the lowest cardinality.

22. The one or more non-transitory computer readable storage media of claim 14 with the program code, when executed by the one or more processors, further performing the act of:
for one or more discovered simple key candidate columns of the dimension candidate group, selecting a simple key candidate column having a lowest average length of the column entries as a simple primary key.

23. The one or more non-transitory computer readable storage media of claim 19 with the program code, when executed by the one or more processors, further performing the act of:
eliminating duplicate dimension candidate groups;
eliminating a dimension candidate group that is a subgroup of another dimension candidate group; and
eliminating excessive dimension candidate groups.

24. The one or more non-transitory computer readable storage media of claim 14 with the program code, when executed by the one or more processors, further performing the act of:

for one or more discovered simple key candidate columns of a dimension candidate group, selecting a simple key candidate column having entries of type integer as a simple key column.

25. The one or more non-transitory computer readable storage media of claim 14 with the program code, when executed by the one or more processors, further performing the act of:

moving, in response to input signals, a selected column from a first to a second dimension candidate group.

26. The one or more non-transitory computer readable storage media of claim 14 with the program code, when executed by the one or more processors, further performing the act of:

merging, in response to input signals, a first dimension candidate group into a second dimension candidate group.

27. A web server including one or more processors and a memory storing program code, where the processor executes the program code to perform the following acts:

identifying columns of a source table having entries of data type "real" as measure column candidates, with the source table stored in an external database coupled to the web server by a network, and with the source table including a plurality of rows and columns with each column having a multi-character name and having one or more entries, with entries in a single column constrained to being of a single data type and with each column having a cardinality value equal to the number of distinct entries in the column;

combining non-measure column candidates identified as having names including a common character string into a dimension candidate group;

running one or more structured query language (SQL) statements to determine a column cardinality value of each single column in the dimension candidate group and a group cardinality value of all the columns in the dimension candidate group;

designating each single column having a column cardinality value equal to the group cardinality value as a simple key candidate column;

executing one or more structured query language (SQL) statements to determine a column-pair cardinality value of each pair of columns in the dimension candidate group if no simple key candidate exists;

designating a pair of columns in the dimension candidate group having a column-pair cardinality value equal to the group cardinality value as a complex key candidate pair of columns of the dimension candidate group;

grouping measure column candidates and keys of dimension candidate groups to form a candidate fact table; and identifying a plurality of different dimension candidate groups with key candidate columns, with each dimension candidate group including columns having names including a common character string and one of the key candidate columns, wherein a first subset of the key candidate columns are simple key candidate columns and a second subset of the key candidate columns are complex key candidate columns.

* * * * *